(12) United States Patent
Yamamoto et al.

(10) Patent No.: US 11,695,282 B2
(45) Date of Patent: Jul. 4, 2023

(54) BATTERY DEVICE

(71) Applicant: DENSO CORPORATION, Kariya (JP)

(72) Inventors: Kohei Yamamoto, Kariya (JP); Tatsuki Nishimata, Kariya (JP); Masato Niwa, Kariya (JP); Hidehiro Kinoshita, Kariya (JP); Yoshimitsu Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 729 days.

(21) Appl. No.: 16/360,304

(22) Filed: Mar. 21, 2019

(65) Prior Publication Data

US 2019/0221906 A1   Jul. 18, 2019

Related U.S. Application Data

(63) Continuation of application No. PCT/JP2017/036054, filed on Oct. 4, 2017.

(30) Foreign Application Priority Data

Oct. 14, 2016  (JP) .................................. 2016-202937
Sep. 19, 2017  (JP) .................................. 2017-179311

(51) Int. Cl.
  *H01M 10/42*   (2006.01)
  *H01M 10/6551* (2014.01)
  *H02J 7/00*    (2006.01)
  *H01M 10/667*  (2014.01)
  (Continued)

(52) U.S. Cl.
CPC ....... *H02J 7/00309* (2020.01); *H01M 10/425* (2013.01); *H01M 10/617* (2015.04); *H01M 10/625* (2015.04); *H01M 10/6551* (2015.04); *H01M 10/667* (2015.04);
(Continued)

(58) Field of Classification Search
CPC ............. H01M 10/425; H01M 10/625; H01M 10/6551; H01M 2010/4271; H01M 2220/20; H02J 7/00309; H02J 7/0068
See application file for complete search history.

(56) References Cited

U.S. PATENT DOCUMENTS

2005/0243509 A1   11/2005   Fuseya et al.
2006/0164812 A1    7/2006   Ha et al.
2009/0195334 A1    8/2009   Goi et al.
(Continued)

FOREIGN PATENT DOCUMENTS

JP   2005-316861 A   11/2005
JP   2009-182903 A    8/2009
(Continued)

*Primary Examiner* — Niki Bakhtiari
(74) *Attorney, Agent, or Firm* — Oliff PLC

(57) ABSTRACT

A battery device includes a battery pack, a circuit substrate which acquires battery information on the battery pack or controls charge and discharge of the battery pack, a switch including a first power element or a second power element, and a heat radiator. The switch is a device controlling input and output of electric power to and from the battery pack, and an exterior part of the switch is arranged away from the circuit substrate. The heat radiator is a member made of a material having thermal conductivity, and is in direct contact with or indirect contact via a heat conductor with the exterior part of the switch so that heat of the switch can be transferred.

18 Claims, 9 Drawing Sheets

(51) Int. Cl.
*H01M 10/625* (2014.01)
*H01M 10/617* (2014.01)

(52) U.S. Cl.
CPC ... *H02J 7/0068* (2013.01); *H01M 2010/4271* (2013.01); *H01M 2220/20* (2013.01)

(56) References Cited

U.S. PATENT DOCUMENTS

| | | | | |
|---|---|---|---|---|
| 2010/0066307 | A1* | 3/2010 | Kim | H01M 10/42 |
| | | | | 320/134 |
| 2013/0130071 | A1 | 5/2013 | Adachi et al. | |
| 2013/0143079 | A1 | 6/2013 | Huang et al. | |
| 2013/0163212 | A1 | 6/2013 | Tanaka et al. | |
| 2013/0302660 | A1* | 11/2013 | Shiraishi | H01M 10/61 |
| | | | | 429/120 |
| 2014/0011056 | A1* | 1/2014 | Adachi | B60L 3/0069 |
| | | | | 429/7 |

FOREIGN PATENT DOCUMENTS

| | | |
|---|---|---|
| JP | 2010-009990 A | 1/2010 |
| JP | 2013-141317 A | 7/2013 |
| JP | 2014-13724 A | 1/2014 |
| JP | 2015-153719 A | 8/2015 |

* cited by examiner

BATTERY DEVICE

CROSS REFERENCE TO RELATED APPLICATIONS

The present application is a continuation application of International Patent Application No. PCT/JP2017/036054 filed on Oct. 4, 2017, which designated the U.S. and claims the benefit of priority from Japanese Patent Application No. 2016-202937 filed on Oct. 14, 2016, and Japanese Patent Application No. 2017-0179311 filed on Sep. 19, 2017. The entire disclosures of all of the above applications are incorporated herein by reference.

TECHNICAL FIELD

The present disclosure relates to a battery device.

BACKGROUND

A battery unit includes a power element for controlling input and output of electric power to and from a battery pack. The power element is mounted on a part of a control substrate at a position not overlapping with the battery pack.

SUMMARY

According to at least one embodiment of the present disclosure, a battery device includes a battery, a circuit substrate electrically connected to the battery, a switch configured to control input and output of electric power to and from the battery, and having an exterior part forming an outer surface of the switch and being away from the circuit substrate, and a heat radiator made of a material having thermal conductivity and being in contact directly or indirectly through a heat conductor with the exterior part of the switch so that heat of the switch transfers to the heat radiator.

DETAILED DESCRIPTION

Figure 1:
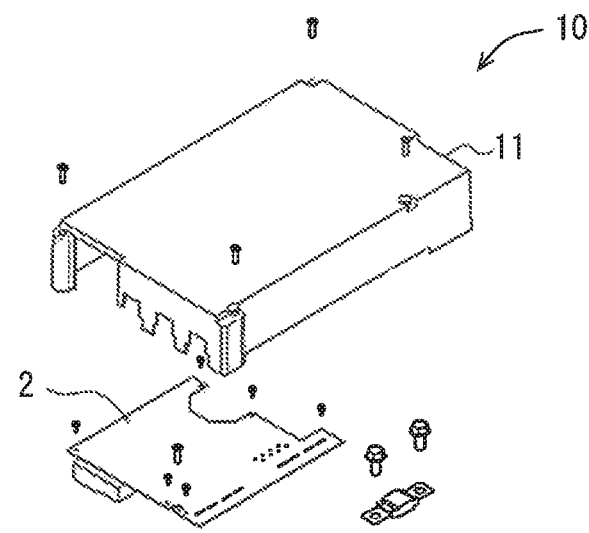
FIG. 1 is an exploded perspective view showing a configuration of a battery device according to at least one embodiment.
Figure 1:
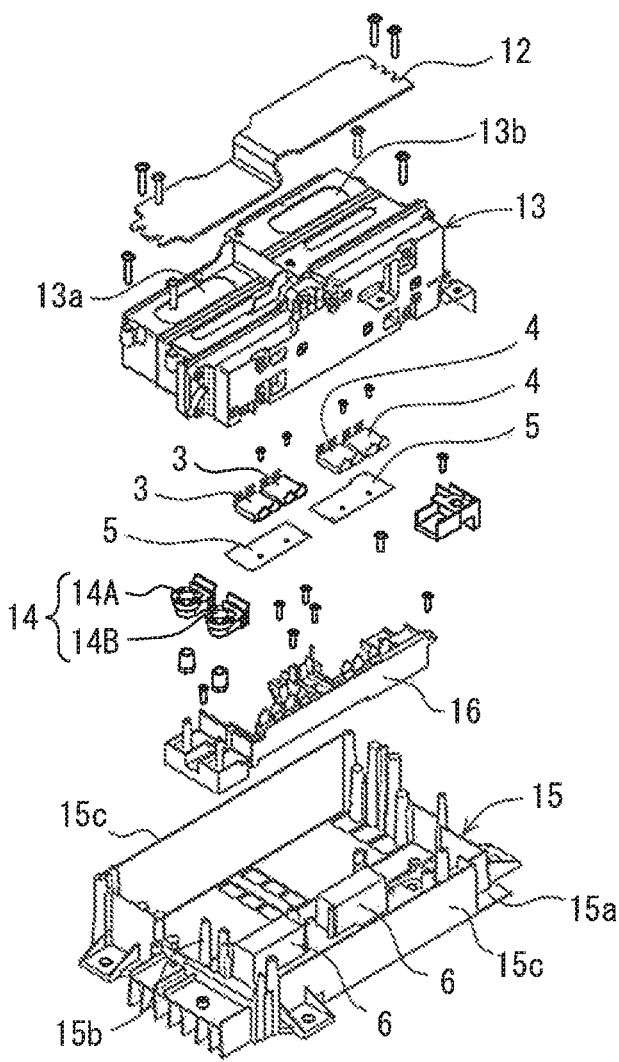

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

First Embodiment

A battery device 10 according to a first embodiment will be described with reference to FIGS. 1 to 8. The battery device 10 can be applied to various kinds of electric devices on which a secondary battery is mounted. Such various electric devices are, for example, a device having a storage battery, a computer, a vehicle, and the like. In the first embodiment, as an example thereof, a case will be described, in which the battery device 10 is used for a vehicle such as a hybrid vehicle using a combination of an internal combustion engine and a battery-driven motor as a traveling drive source, or an electric vehicle traveling with a battery-driven motor.

Next, a configuration of the battery device 10 will be described referring to FIG. 1. The battery device 10 includes a battery pack 13 having a configuration where a plurality of unit cells are stacked, a circuit substrate 2 that performs charge-discharge control of the battery pack 13, a restraining plate 12 that restrains the battery pack 13 from above, and a case for accommodating the battery pack 13. The battery device 10 is installed, for example, under a seat of an automobile, a space between a rear seat and a trunk compartment, or a space between a driver's seat and a passenger seat. The case has a rectangular parallelepiped shape, and includes a base case 15 fixed via a bracket 70 to a place where the battery device 10 is mounted, and a cover 11 attached to the base case 15 so as to cover the base case 15 from above. The base case 15 and the cover 11 are formed of metal, for example, aluminum, copper, alloys thereof, or formed of a resin material. When the base case 15 is formed of a resin material, it is preferable to use a resin material having thermal conductivity, or to mix a material having thermal conductivity with the resin material.

The battery pack 13 and the circuit substrate 2 are disposed to vertically face each other so that the battery pack 13 is lower than the circuit substrate 2, and are individually fixed to the base case 15 by, for example, screws. The cover 11 is attached to the base case 15 from above, whereby the battery pack 13 and the circuit substrate 2 are accommodated in the case.

The battery device 10 includes a terminal block unit 14 for inputting and outputting power, and a connector electrically connected to, for example, a vehicle ECU. The terminal block unit 14 includes a terminal block unit 14A for connection to a Pb storage battery, and a terminal block unit 14B for connection to an ISG. The terminal block unit 14A includes a first input-output terminal 140 connected to an external battery 17 in FIG. 2, and a terminal block supporting the first input-output terminal 140. The terminal block unit 14B includes a second input-output terminal 141 connected to a rotary machine 19 in FIG. 2, and a terminal block supporting the second input-output terminal 141. Each terminal block is formed of an insulating resin material. The terminal block unit 14A and the terminal block unit 14B are individually fixed to the base case 15 at positions side by side.

The external battery 17 and an electric load 18 are connected to a first input-output terminal 140 of the terminal block unit 14A through a harness. The rotary machine 19 is connected to a second input-output terminal 141 of the terminal block unit 14B through a harness. The connector is connected to the vehicle ECU capable of communicating with the controller 100, and is also configured to be connectable to various electric loads which are to be supplied with electric power from the battery device 10. The terminal block unit 14 and the connector are provided on an outer peripheral portion of the case and are provided in a state of being exposed to an outside of the battery device 10.

The controller 100 is a device that manages at least an amount of electricity stored in the battery pack, and may be a battery management unit. Further, the battery management unit may be a device that monitors current, voltage and temperature relating to the battery pack and manages, for example, abnormality of the unit cell and abnormality of electric leakage. The battery management unit is configured to be capable of communicating with various electronic control devices mounted in the vehicle. A signal related to a current value detected by a current sensor may be input to the battery management unit, or the battery management unit may be a control device that controls operations of a main relay or a pre-charge relay. The battery management unit may function as a device for controlling an operation of a motor of an air blower that drives cooling fluid in order to cool a heating element such as a unit cell. The battery management unit is configured to be capable of communicating with various electronic control devices (e.g. vehicle ECU) mounted in the vehicle.

Figure 3:
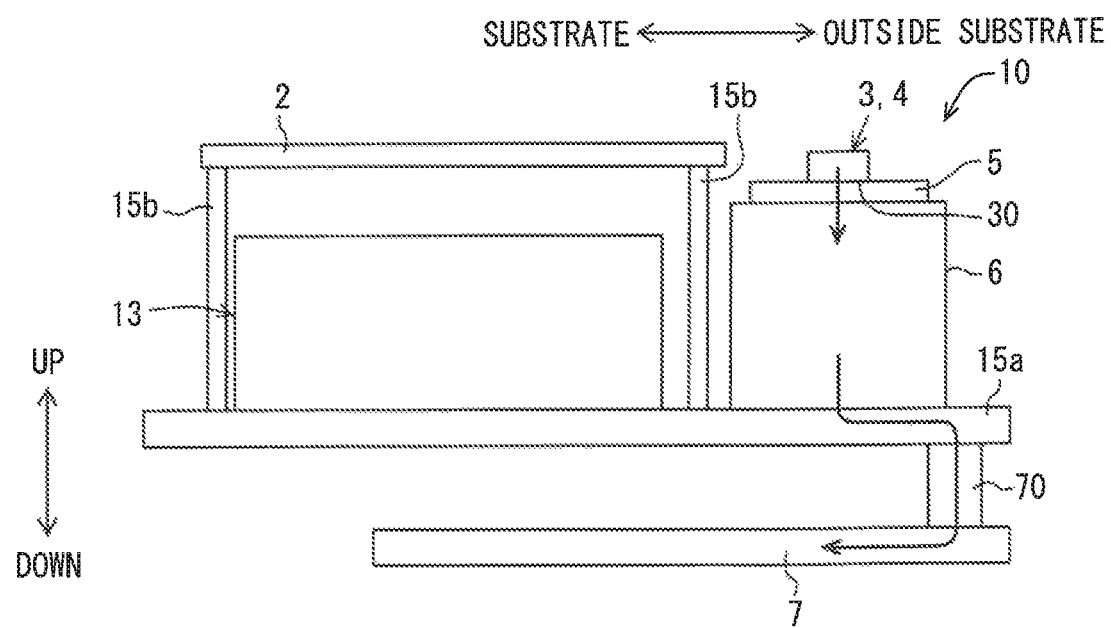
FIG. 3 is a schematic diagram showing a heat transfer path through which heat of a power element is transferred to the battery device of at least one embodiment.

FIG. 3 shows a state in which the cover 11 has been removed from the battery device 10. The base case 15 includes a base 15a, a fixing boss 15b erecting on the base 15a, and a lateral wall 15c erecting on the base 15a. The base 15a has a rectangular shape, and the lateral wall 15c is formed at a peripheral edge of the base 15a. The base 15a is a battery placing portion on which the battery pack 13 is placed. The circuit substrate 2 and the restraining plate 12 are fixed by screws or the like to the upper end portions of the lateral wall 15c and the boss 15b.

The base case 15 is integrally formed with a heat radiator 6 for dissipating heat generated in a first power element 3 and a second power element 4, which are power-control semiconductor elements, to the outside. The heat radiator 6 forms a part of the base case 15. The heat radiator 6 can be formed of, for example, aluminum, copper, or an alloy thereof. The first power element 3 and the second power element 4 are semiconductor switching elements, and are an example of a switch that controls input and output of power to and from the battery. The heat radiator 6 is provided at a position adjacent to the battery pack 13, and a flat portion on an upper surface of the heat radiator 6 faces exterior portions of the first power element 3 and the second power element 4 across a heat conductor 5. The circuit substrate 2 is electrically and individually connected to the battery pack 13 and the switch.

The exterior part corresponds to an exterior case for protecting the heart of the device, and is made of various materials capable of releasing heat generated inside to outside. The exterior part is in the shape of a flattened rectangular parallelepiped and made of, for example, resin. The heat conductor 5 is a member having thermal conductivity and electrical insulating properties, and for example, a member made of a silicon based material can be used. The heat conductor 5 is preferably deformable by an external force so as to be in close contact with the heat radiator 6 or the exterior part forming the outer surface of the switch, and may be made of an elastically deformable sheet, gel or grease, for example. The heat conductor 5 transfers heat and electrically insulates between each power element and the heat radiator 6.

The heat radiator 6 is connected to a vehicle member 7 which is a part of a vehicle through the bracket 70 such that heat is allowed to be transferred from the heat radiator 6 to the vehicle member 7. The vehicle member 7 is, for example, a frame member through which a predetermined device is fixed to the vehicle, a member coupled to a chassis, or a member supporting an interior material forming an interior of the vehicle compartment. The bracket 70 is made of a material having thermal conductivity, and is an attachment connecting the base 15a and the vehicle member 7. The heat radiator 6 has a rectangular box body whose inside is a hollow. As indicated by arrows in FIG. 3, the heat generated by each power element moves from its exterior part through the heat conductor 5 to a contact part with the heat radiator 6, and moves downward from a flat part of the heat radiator 6 to a lateral wall of the box body. Further, the heat is transferred from a lower end of the lateral wall to the base 15a and is released to the vehicle member 7 via the bracket 70. The heat radiator 6 may be directly connected to the vehicle member 7 without through the bracket 70.

Figure 2:
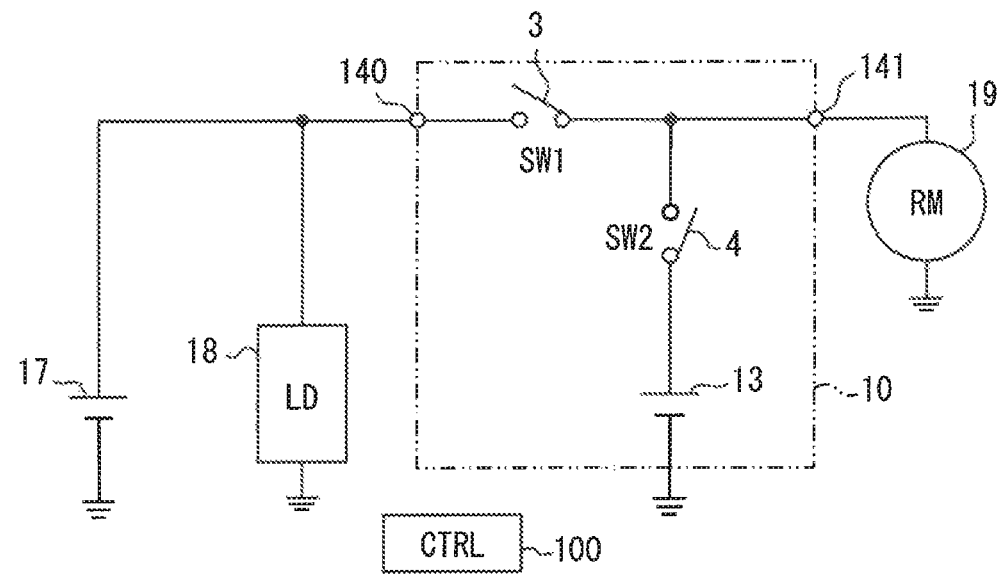
FIG. 2 is a circuit diagram related to the battery device of at least one embodiment.

As shown in FIG. 2, a circuit configuration related to the battery device 10 includes the external battery 17, the battery pack 13, the rotary machine 19 that is a motor generator, the electric load 18, the first power element 3, the second power element 4 and the controller 100. The battery pack 13 is an internal battery installed inside a case that houses the battery device 10, and includes, for example, a lithium ion secondary battery. The battery pack 13 is preferably a secondary battery having low resistance and excellent regenerative performance. The external battery 17 is a secondary battery installed outside the case that houses the battery device 10, and includes, for example, a lead storage battery. The external battery 17 is preferably a secondary battery having a large capacity.

Figure 4:
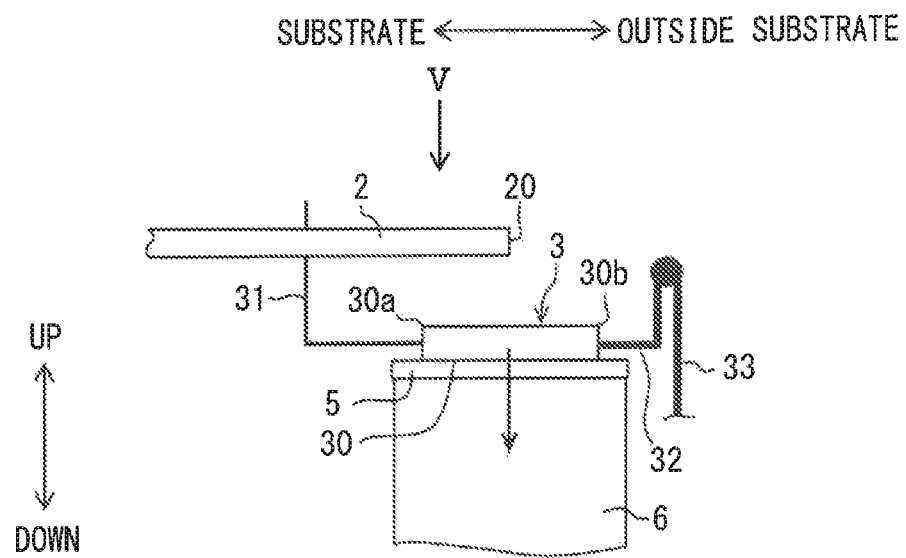
FIG. 4 is a side view showing a relationship between a circuit substrate, a power element, and a heat radiator.

The components constituting the controller 100 are mounted on the circuit substrate 2. The controller 100 performs switching between ON (closing) and OFF (opening) of each of the power elements, thereby controlling charging and discharging of each of the external battery 17 and the battery pack 13. As shown in FIG. 4, in the battery device 10, the switches such as the first power element 3 and the second power element 4 are connected to the circuit substrate 2 in a state where signal communication is possible through a signal line 31 in which current for power supply does not flow. Furthermore, in the switch, a power line 32 through which a large current for power supply flows is not connected to the circuit substrate 2. Therefore, in the switch, a large current flowing through a switch body and the power line 32 is not transmitted to the circuit substrate 2.

In the battery device 10, the first input-output terminal 140 and a second input-output terminal 141 are provided as external terminals. The external battery 17 and the electric load 18 are connected in parallel to the first input-output terminal 140. The first power element 3 and the second input-output terminal 141 are connected in series to a side of the first input-output terminal 140 opposite from the external battery 17. Further, the external battery 17 is connected to the electric load 18 so as to be capable of supplying electric power. The electric load 18 is a general electrical load other than an electric load requiring constant voltage. The electric load 18 is, for example, a headlight, a wiper for a front windshield or the like, a blower fan of an air conditioner, or a heater for defogging of a rear windshield.

The second power element 4 and the battery pack 13 are connected in series to a connection part between the first power element 3 and the second input-output terminal 141. The rotary machine 19 is connected to a side of the second input-output terminal 141 opposite from the first power element 3. The first power element 3 and the second power element 4 are connected in parallel to the rotary machine 19. The first power element 3 as a first switch functions as a switch that switches between a power supply state and a non-power supply state. In the power supply state, power supply can be performed between the rotary machine 19 and each of the external battery 17 and the electric load 18. In the non-power supply state, such power supply cannot be performed. The second power element 4 as a second switch functions as a switch that switches between a power supply state and a non-power supply state. In the power supply state, power supply can be performed between the rotary machine 19 and the battery pack 13. In the non-power supply state, such power supply cannot be performed.

The rotary machine 19 has a power generating function of generating power by rotation of a crankshaft of an engine, i.e. regenerative electric power, and a power output function of imparting rotational force to the crankshaft, thereby constituting an ISG (Integrated Starter Generator). The external battery 17 and the battery pack 13 are electrically connected in parallel to the rotary machine 19. When the first power element 3 is turned on, the external battery 17 becomes ready for being supplied with electric power from the rotary machine 19, and the regenerative electric power can be charged. When the second power element 4 is turned on, the battery pack 13 becomes ready for being supplied with electric power from the rotary machine 19, and the regenerative electric power can be charged. Therefore, each of the first power element 3 and the second power element 4 forms a part of a large current path in which a relatively large current flows between the rotary machine 19 and each battery.

Next, with reference to FIG. 4 and FIG. 5, a relation of arrangement of the circuit substrate 2, each power element, the heat conductor 5 and the heat radiator 6 will be described. Since the first power element 3 and the second power element 4 have similar configurations with respect to the relation of arrangement with the circuit substrate 2, the first power element 3 will be described as a representative in the following descriptions. Therefore, in the following descriptions, it is possible to explain the relation of arrangement of the second power element 4 and the circuit substrate 2 and the like by replacing the first power element 3 with the second power element 4.

Figure 5:
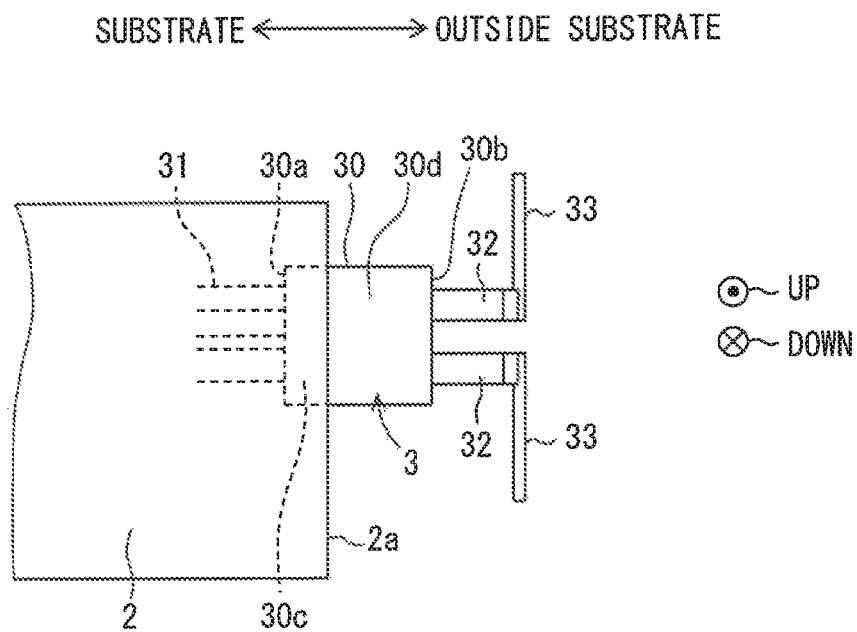
FIG. 5 is a top view from a direction V in FIG. 4.

As shown in FIG. 4 and FIG. 5, the first power element 3 is disposed below and away from the circuit substrate 2, and has a thickness direction that is orthogonal to the main surface of the circuit substrate 2. Thus, the first power element 3 is transversely placed and is in contact indirectly with the heat radiator 6 via the heat conductor 5. Therefore, the first power element 3 and the heat radiator 6 are disposed at positions below the circuit substrate 2. In the first power element 3, a direction in which the signal line 31 and the power line 32 protrude from the exterior part 30 is parallel to a direction along the main surface of the circuit substrate 2. A direction along an element width that is a length between ends from which the signal line 31 and the power line 32 protrude is parallel to the direction along the main surface of the circuit substrate 2. The first power element 3 has an outer shape in which the width of the exterior part 30 is longer than its thickness.

The signal line 31 extends laterally from the exterior part 30 and then extends so as to be bent in a direction orthogonal to the main surface of the circuit substrate 2. The signal line 31 is connected to the circuit substrate 2 or connected to electronic components mounted on the circuit substrate 2. The power line 32 of the first power element 3 is not connected to the circuit substrate 2, and is connected to the first input-output terminal 140 and the second input-output terminal 141 via a bus bar 33. The power line 32 is a conductive terminal joined to the bus bar 33 by welding, for example. The bus bar 33 is supported by a bus-bar support 16 which is accommodated in the base case 15 together with the battery pack 13 and others. The bus bar 33 is a conductive plate member coupled to the first input-output terminal 140 and the second input-output terminal 141. The bus-bar support 16 is also a bus-bar casing that houses the bus bar 33 in a stable state. The bus-bar support 16 is formed of a material having electrical insulation properties to insulate the bus bar 33 from surrounding members.

The heat radiator 6 has a thermal connection portion with the first power element 3 on a surface extending in the lateral direction. In addition, the exterior part 30 may be configured to be in direct contact with the heat radiator 6. Means for fixing the first power element 3 to the heat conductor 5 or the heat radiator 6 may include fastening with an insulating adhesive, for example, a silicon-based adhesive, a bolt or a screw. The heat radiator 6 is disposed on the base 15a of the base case 15 accommodating the battery pack 13 in such a configuration that heat can be transferred from the heat radiator 6 to the base 15a. According to the above configuration, the heat transferred from the exterior part 30 of the power element 3 to the heat radiator 6 through the heat conductor 5 transfers to the base 15a, and further transfers to the vehicle member 7 via the bracket 70, thereby the heat being released.

As shown in FIG. 5, an end portion 20, which is a part of an outer peripheral edge of the circuit substrate 2, is located at a position overlapping with the first power element 3 that exists at a position lower than the circuit substrate 2. In other words, a first end portion 30a, which is a part of an outer peripheral edge of the first power element 3 facing the substrate, is provided at a position directly below the circuit substrate 2. A second end portion 30b opposite to the first end portion 30a is provided at a position below and outside the circuit substrate 2. Therefore, when the first power element 3 and the circuit substrate 2 are viewed from above, the first power element 3 positioned below the circuit substrate 2 has an overlapping portion 30c that overlaps the circuit substrate 2, and a remaining portion 30d that does not overlap the circuit substrate 2. Further, it is preferable, from the viewpoints of heat dissipation and ease of connection with the bus bar 33, that the first power element 3 and the circuit substrate 2 have a positional relationship that the volume of the remaining portion 30d is equal to or larger than the volume of the overlapping portion 30c.

The battery pack 13 includes a plurality of unit cells connected in series to each other, and these unit cells are accommodated in a battery case in a predetermined arrangement. In this embodiment, as shown in FIG. 1, a first battery stack 13a including two unit cells vertically stacked each other and a second battery stack 13b including three unit cells vertically stacked each other are arranged side by side in two rows. Each of the five unit cells is a thin rectangular parallelepiped lithium ion secondary battery, and is installed horizontally with its thickness direction becoming parallel to the vertical direction. Since all of the unit cells constituting the battery stacks are connected in series, the battery stacks are electrically connected. All the battery stacks are electrically connected and are integrated to each other, thereby functioning as the battery pack 13 of the battery device 10.

Figure 6:
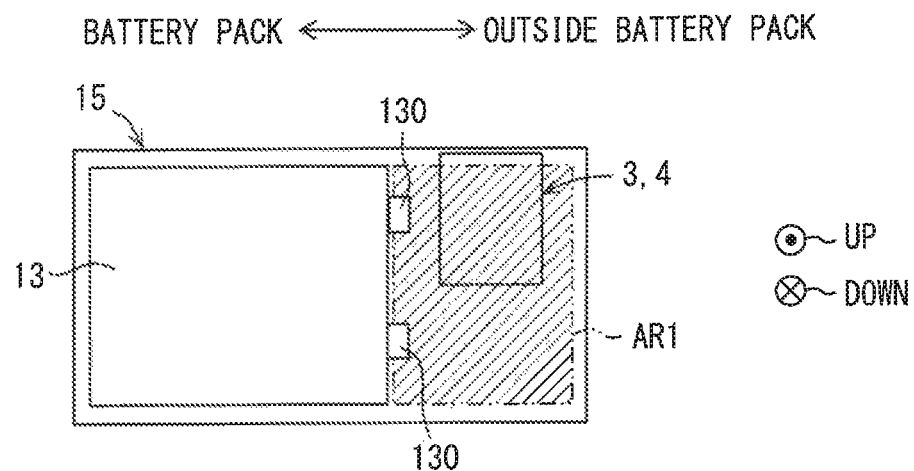
FIG. 6 is a schematic top view showing a first example of a positional relationship between a battery and a power element in the battery device of at least one embodiment.

Next, in the battery device 10, the positional relationship between the battery pack 13 and the switches will be described with reference to FIGS. 6 to 8. The battery pack 13 of an example shown in FIG. 6 is composed of one battery stack. In this case, a part or whole of the element group including the first power element 3 and the second power element 4 is in a predetermined area AR1 which is, in top view, adjacent to the battery stack inside the battery device 10 and has a length same as the width of the battery stack. It is preferable that at least a part of elements that are the first power element 3 and the second power element 4 is in the area AR1 which is adjacent to electrode terminals 130 of the battery stack in the protruding direction of the electrode terminals 130. According to the battery pack 13 having such configuration, it is possible to shorten the distance between the battery, the power element, and the input-output terminal. Although the battery pack 13 shown in FIG. 6 is constituted by the plurality of unit cells stacked in the vertical direction, it may be constituted by a plurality of unit cells stacked in the transverse direction.

Figure 7:
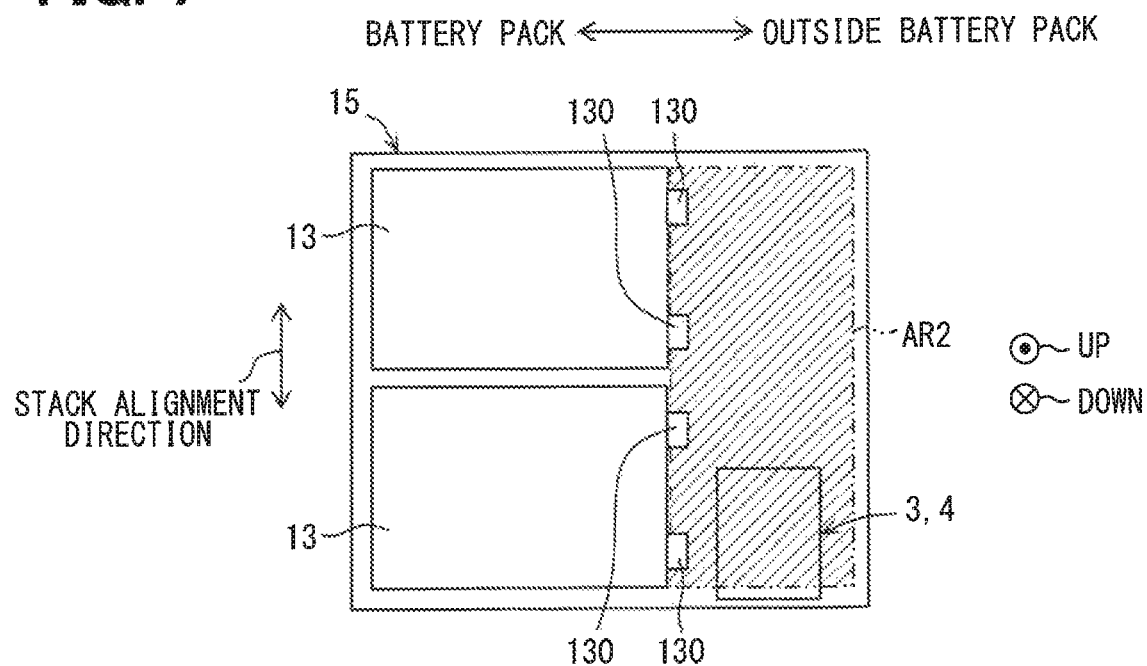
FIG. 7 is a schematic top view showing a second example of a positional relationship between a battery and a power element in the battery device of at least one embodiment.

The battery pack 13 of an example shown in FIG. 7 is composed of two battery stacks having the same number of stacked unit cells. In this case, a part or whole of the element group including the first power element 3 and the second power element 4 is in a predetermined area AR2 which is, in top view, adjacent to the two battery stacks inside the battery device 10 and has a length same as a length of the two battery stack in its alignment direction. It is preferable that at least a part of elements that are the first power element 3 and the second power element 4 is in the area AR2 which is adjacent to electrode terminals 130 of the battery stack in the protruding direction of the electrode terminals 130. Although the battery pack 13 shown in FIG. 7 is constituted by the plurality of unit cells stacked in the vertical direction, it may be constituted by a plurality of unit cells stacked in the transverse direction.

Figure 8:
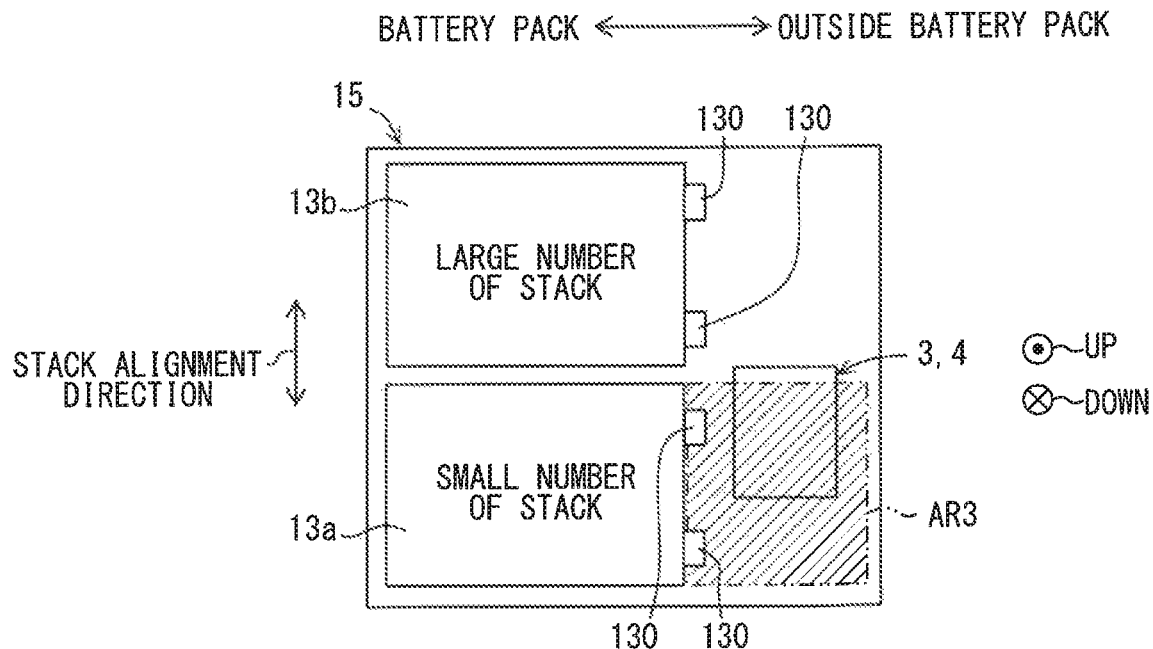
FIG. 8 is a schematic top view showing a third example of a positional relationship between a battery and a power element in the battery device of at least one embodiment.

The battery pack 13 of an example shown in FIG. 8 is composed of two battery stacks 13a, 13b having different number of stacked unit cells. In this case, a part or whole of the element group including the first power element 3 and the second power element 4 is in a predetermined area AR3 which is, in top view, adjacent to the first battery stack 13a having smaller number of stacked unit cells inside the battery device 10 and has a length same as the width of the first battery stack 13a. According to the battery pack 13 having such configuration, since the power element is installed in a place close to the first battery stack 13a which has a smaller number of stacked unit cells and a smaller heat generation among the multiple battery stacks, thermal heterogeneity in the battery device 10 can be reduced.

It is preferable that at least a part of elements that are the first power element 3 and the second power element 4 is in the area AR3 which is adjacent to electrode terminals 130 of the battery stack 13a in the protruding direction of the electrode terminals 130. Although the battery pack 13 shown in FIG. 8 is constituted by the plurality of unit cells stacked in the vertical direction, it may be constituted by a plurality of unit cells stacked in the transverse direction. In addition, each of the battery packs 13 shown in FIGS. 6 to 8 may be configured such that the protruding direction of the electrode terminals 130 is not in the lateral direction but in the upward direction or the downward direction.

Next, effects obtained by the battery device 10 of the first embodiment will be described. The battery device 10 includes the battery pack 13, the circuit substrate 2 which acquires battery information on the battery pack 13 or controls charge and discharge of the battery pack 13, the switch including the first power element 3 and the second power element 4, and the heat radiator 6. The switch is a device controlling input and output of electric power to and from the battery pack 13, and the exterior part 30 of the switch is arranged in a state of being separated from the circuit substrate 2. The heat radiator 6 is a member made of a material having thermal conductivity, and is in direct contact with or indirect contact via the heat conductor 5 with the exterior part 30 of the switch so that heat of the switch can be transferred.

According to this battery device 10, the switch is in a state where the exterior part 30 is away from the circuit substrate 2, and the exterior part 30 is in contact directly or indirectly through the heat conductor 5 with the heat radiator 6. As a result, the heat of the switch can be quickly transferred to the heat radiator 6 rather than to the circuit substrate 2. Therefore, it is possible to realize the battery device 10, in which it is unnecessary to take measures to suppress heat generation of the switch for preventing the circuit substrate 2 from being greatly increased in temperature due to heat generation of the switch. In addition, it is possible to avoid situations where the heat resistant temperature of the circuit substrate 2 becomes a bottleneck and the performance of the switch cannot be fully delivered. Therefore, a high output battery device 10 can be realized. Therefore, it is possible to provide the battery device 10 capable of delivering the performance of the switch without restriction of the heat resistant temperature of the circuit substrate 2.

The switch includes the signal line 31 transmitting an electric signal, and a power line 32 transmitting electric power. The power line 32 is not connected to the circuit substrate 2, but is connected to the input-output terminals 140, 141 of the battery via the bus bar 33. The signal line 31 is a lead terminal protruding outward from the inside of the switch and is connected to the circuit substrate 2. The signal line 31 is connected to the circuit substrate 2 by extending the signal line 31 through the hole of the substrate and soldering it to one side or both sides of the substrate. According to this configuration, since no large current flows through the signal line 31, large heat transfer from the signal line 31 to the circuit substrate 2 does not occur. Since the power line 32 is not connected to the circuit substrate 2, heat generated in the power line 32 is prevented from transferring to the circuit substrate 2. Therefore, the heat generated in the power line 32 can be transferred to the heat radiator 6 through the switch and release the heat, and thereby released.

The heat radiator 6 is connected to the vehicle member 7 which is a part of a vehicle directly or indirectly through the bracket 70 having thermal conductivity such that heat is allowed to be transferred from the heat radiator 6 to the vehicle member 7. According to this configuration, since heat of the switch can be transferred to the vehicle member 7 having a large heat capacity through the heat radiator 6, the heat of the switch can be promptly discharged to the outside of the battery device 10. Further, heat can be dissipated in a simple manner by using the vehicle member 7 without using a dedicated cooler.

The heat radiator 6 is disposed on the base 15a of the base case 15 accommodating the battery in such a configuration that heat can be transferred from the heat radiator 6 to the base 15a having thermal conductivity. According to this configuration, since heat of the switch can be transferred to the outside of the battery device 10 through a whole of the bottom of the case housing the battery, the heat of the switch can be promptly discharged to the outside.

The switch and the heat radiator 6 are positioned away from and below the circuit substrate 2. According to this configuration, the heat of the switch can be quickly transferred downward from the circuit substrate 2. Thus, heat radiation toward the upper circuit substrate 2 can be reduced, and thermal influence on electronic components mounted on the circuit substrate 2 can be reduced.

The switch and the heat radiator may be positioned away from and above the circuit substrate 2. According to this configuration, the heat of the switch can be quickly transferred upward above the circuit substrate 2 by utilizing heat upward rise. Accordingly, heat radiation downward to the circuit board 2 can be reduced, and thermal influence on the electronic components mounted on the circuit substrate 2 can be reduced.

When the switch and the circuit substrate 2 are viewed from above, the switch has the overlapping portion 30c that overlaps the circuit substrate 2, and the remaining portion 30d that does not overlap the circuit substrate 2. The switch is positioned such that the volume of the remaining portion 30d is larger than or equal to the volume of the overlapping portion 30c. According to this configuration, it is possible to provide a configuration in which heat radiation from the surface of the exterior part 30 of the switch to the circuit substrate 2 is reduced.

The battery pack 13 is arranged in such a manner that the electrode terminals 130 are exposed in the lateral direction. The switch is positioned closer to the electrode terminals 130 with respect to the battery pack 13. According to such configuration, it is possible to provide the battery device 10 capable of shortening a length of electric path between the battery, the switch, and the input-output terminal.

The switch is positioned closer to the battery stack 13a having a smaller number of stacked unit cells among the multiple battery stacks. According to this configuration, the switch can be placed close to the battery stack 13a having a small number of stacks and a small heat generation amount. Thus, it is possible to provide the battery device 10 can reduce heterogeneity of heat generation areas in the entire battery device 10.

The switch includes the first switch that controls input and output of electric power to and from the external battery 17 provided outside the battery device 10, and the second switch that controls input and output of electric power to and from the battery included in the battery device 10. According to this configuration, the heat of the first switch that controls the input and output of electric power to and from the external battery 17 and the heat of the second switch that controls input and output of electric power to and from the battery included in the battery device 10 can be quickly transferred to the heat radiator 6 to be released. Therefore, it is possible to provide the battery device 10 capable of delivering the performance of both the first switch and the second switch without restriction of the heat resistant temperature of the circuit substrate 2.

Second Embodiment

Figure 9:
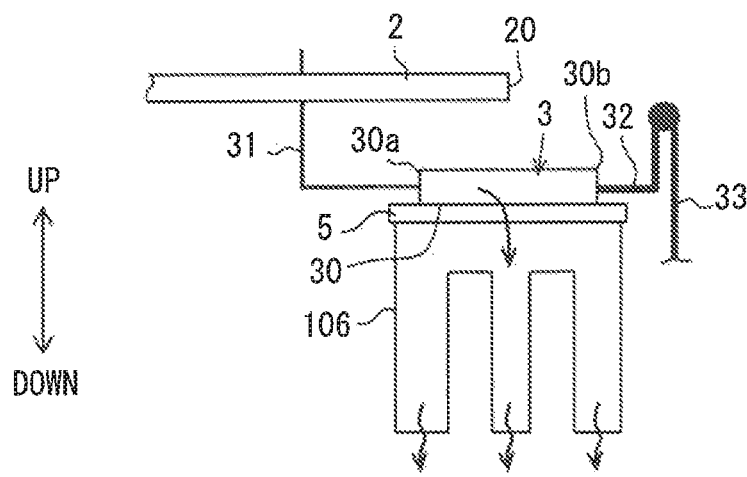
FIG. 9 is a side view showing a relationship between a circuit substrate, a power element, and a heat radiator according to at least one embodiment.

In a second embodiment, a battery device including a heat radiator 106 which is another embodiment of the first embodiment will be described with reference to FIG. 9. In FIG. 9, components denoted by the same reference numerals as those in the drawings of the first embodiment are the same components and exert similar operational effects. The heat radiator 106 exerts the same effect as that of the heat radiator 6 of the first embodiment. Hereinafter, contents different from the first embodiment will be described.

As shown in FIG. 9, the heat radiator 106 is indirectly in contact with the exterior part 30 of the first power element 3 through the heat conductor 5 so that heat of the first power element 3 can be transferred to the heat radiator 106. In addition, the heat radiator 106 may be directly in contact with the exterior part 30. The heat radiator 106 has a heat release path for releasing the heat transferred from the exterior part 30 of the first power element 3 through the heat conductor 5, for example, a path through which the heat is released from a plurality of fin portions to ambient air. Similar to the heat radiator 6, the heat radiator 106 is made of a material having thermal conductivity, for example, various metals such as aluminum, copper, and alloys thereof.

Third Embodiment

Figure 10:
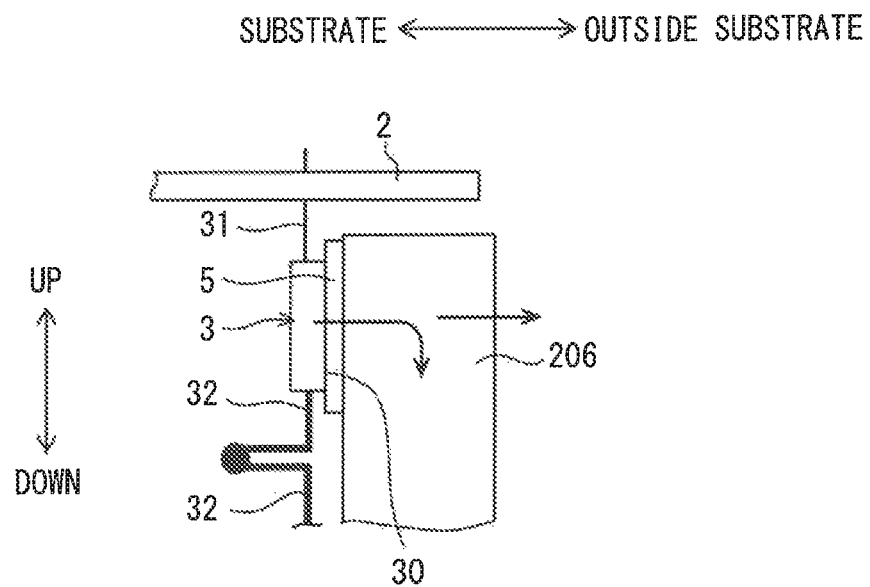
FIG. 10 is a side view showing a relationship between a circuit substrate, a power element, and a heat radiator according to at least one embodiment.

In a third embodiment, a configuration related to a thermal connection between a first power element 3 and a heat radiator 206, which is another embodiment of the first embodiment, will be described with reference to FIG. 10. In FIG. 10, components denoted by the same reference numerals as those in the drawings of the first embodiment are the same components and exert similar operational effects. The heat radiator 206 exerts the same effect as that of the heat radiator 6 of the first embodiment. Hereinafter, contents different from the first embodiment will be described.

As shown in FIG. 10, the first power element 3 is disposed such that its thickness direction is along the main surface of the circuit substrate 2, and the first power element 3 is in contact indirectly with the heat radiator 206 via the heat conductor 5. The first power element 3 is in contact with the heat radiator 206 such that heat can be transferred therebetween, and first power element 3 is vertically arranged such that an extending direction of the signal line 31 from the exterior part 30 is orthogonal to the main surface of the circuit substrate 2. Thus, the heat radiator 206 has a thermal connection portion with the first power element 3 on a surface extending in the vertical direction. In addition, the exterior part 30 may be configured to be in direct contact with the heat radiator 206. The heat radiator 206 is, similar to the heat radiator 6, disposed on the base 15a of the base case 15 accommodating the battery pack 13 in such a configuration that heat can be transferred from the heat radiator 206 to the base 15a.

According to the above configuration, the heat transferred from the exterior part 30 of the first power element 3 to the heat radiator 206 through the heat conductor 5 transfers to the base 15a, and further transfers to the vehicle member 7 through the bracket 70, thereby the heat being released. Further, the heat radiator 206 in the third embodiment can be replaced with the heat radiator 106 of the second embodiment. This replacement provides a heat release path for radiating the heat emitted from the exterior part 30 of the first power element 3 to the ambient air from the plurality of fin portions.

According to the third embodiment, the first power element 3, the heat conductor 5, and the heat radiator 206 can be disposed directly below or directly above the circuit substrate 2. Therefore, the size of the battery device 10 in the lateral direction can be reduced. Further, according to the third embodiment, the power line 32 extending from an end portion of the exterior part 30 opposite from the end portion from which the signal line 31 extends can be positioned away from the circuit substrate 2. Thus, it is possible to reduce influence of noise on the circuit substrate 2.

Fourth Embodiment

Figure 11:
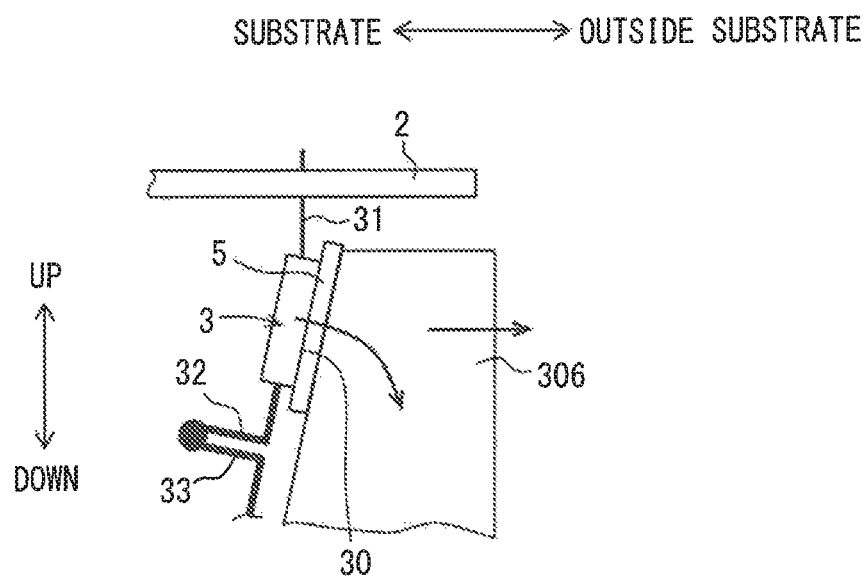
FIG. 11 is a side view showing a relationship between a circuit substrate, a power element, and a heat radiator according to at least one embodiment.

In a fourth embodiment, a configuration related to a thermal connection between a first power element 3 and a heat radiator 206, which is another embodiment of the third embodiment, will be described with reference to FIG. 11. In FIG. 11, components denoted by the same reference numerals as those in the drawings of the above embodiments are the same components and exert similar operational effects. The heat radiator 306 exerts the same effect as that of the heat radiator 6 or the heat radiator 206. Hereinafter, contents different from the third embodiment will be described.

As shown in FIG. 11, the first power element 3 is disposed such that its thickness direction is oblique to the main surface of the circuit substrate 2, and the first power element 3 is in contact indirectly with the heat radiator 306 via the heat conductor 5. The first power element 3 is in contact with the heat radiator 306 such that heat can be transferred therebetween, and the first power element 3 is oblique to the main surface of the circuit board 2. Thus, the heat radiator 306 has a thermal connection portion with the first power element 3 on a surface extending in a direction oblique to the vertical direction. In addition, the exterior part 30 may be configured to be in direct contact with the heat radiator 306. The heat radiator 306 is, similar to the heat radiator 206, disposed on the base 15a of the base case 15 accommodating the battery pack 13 in such a configuration that heat can be transferred from the heat radiator 306 to the base 15a.

According to the fourth embodiment, the first power element 3, the heat conductor 5, and the heat radiator 306 can be disposed directly below or directly above the circuit substrate 2. Therefore, the size of the battery device 10 in the lateral direction can be reduced. Further, similar to the third embodiment, since the power line 32 can be positioned away from the circuit substrate 2, the influence of noise on the circuit substrate 2 can be reduced.

Fifth Embodiment

Figure 12:
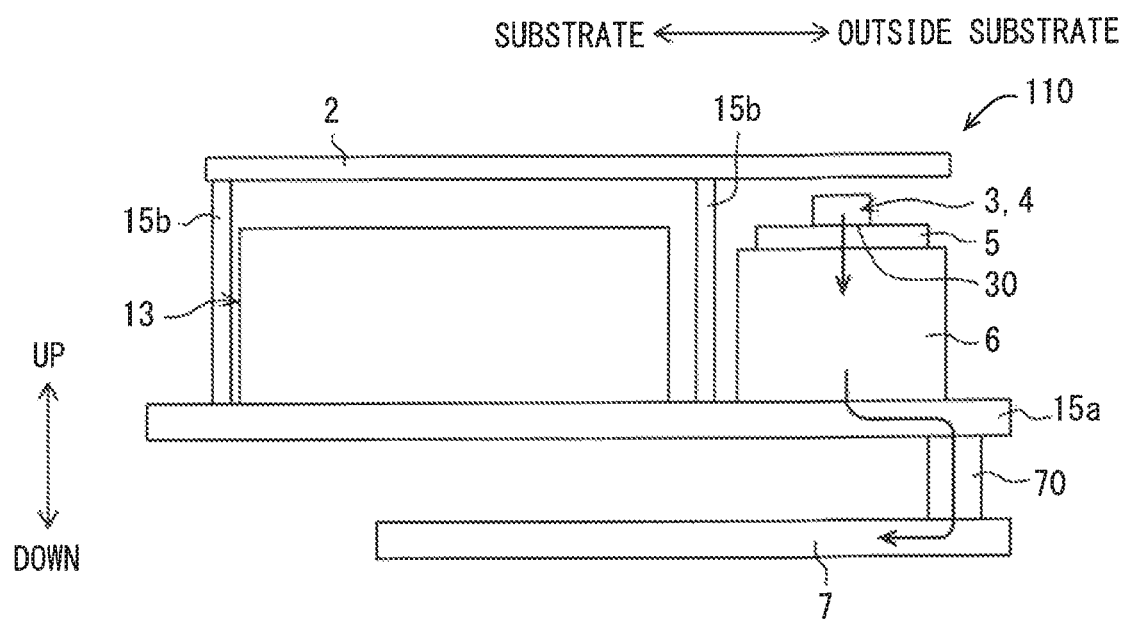
FIG. 12 is a schematic diagram showing a heat transfer path through which heat of a power element is transferred to the battery device of at least one embodiment.

In a fifth embodiment, a battery device 110 which is another embodiment of the first embodiment will be described with reference to FIG. 12. In FIG. 12, components denoted by the same reference numerals as those in the drawings of the first embodiment are the same components and exert similar operational effects. The heat release path from the first power element 3 to the vehicle member 7 in the battery device 110 is similar to that of the battery device 10 of the first embodiment. The battery device 110 exhibits the same operational effects as those of the battery device 10 described in the first embodiment. Hereinafter, contents different from the first embodiment will be described.

As shown in FIG. 12, the first power element 3 is disposed directly below the circuit substrate 2. Therefore, the circuit substrate 2 extends directly above the first power element 3. The power line 32 of the first power element 3 is not connected to the circuit substrate 2, and is connected to the first input-output terminal 140 and the second input-output terminal 141 via a bus bar 33. The signal line 31 of the first power element 3 is connected to the circuit substrate 2.

According to the battery device 110 of the fifth embodiment, since the highest position of the first power element 3 is below the circuit board 2, the heat release path from the first power element 3 to the base 15a can be shortened. Therefore, the heat release path of the battery device 110 can be shortened and contribute to improvement of a heat release performance.

Sixth Embodiment

Figure 13:
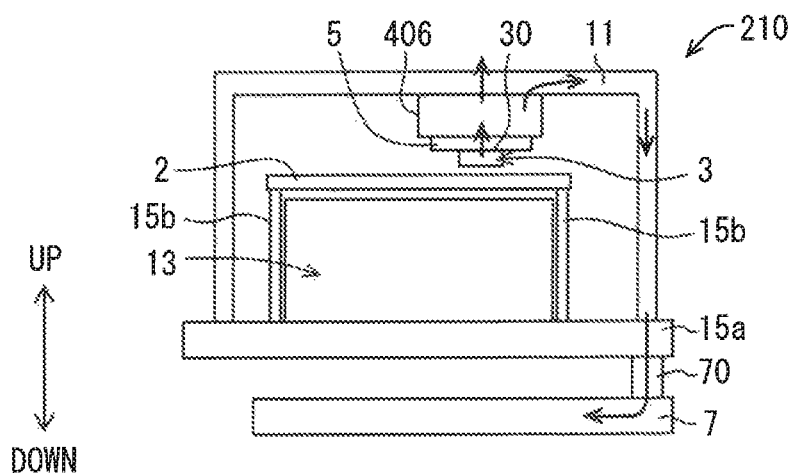
FIG. 13 is a schematic diagram showing a heat transfer path through which heat of a power element is transferred to the battery device of at least one embodiment.
Figure 14:
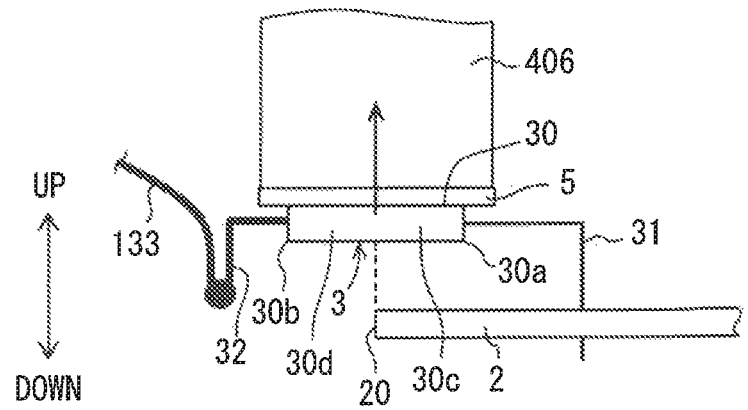
FIG. 14 is a side view showing a relationship between a circuit substrate, the power element, and a heat radiator according to at least one embodiment.

In a sixth embodiment, a battery device 210 which is another embodiment of the first embodiment will be described with reference to FIG. 13. In FIGS. 13 and 14, components denoted by the same reference numerals as those in the drawings of the first embodiment are the same components and exert similar operational effects. The heat release path from the first power element 3 to the vehicle member 7 in the battery device 210 is different from that of the battery device 10 of the first embodiment. Hereinafter, contents different from the first embodiment will be described.

As shown in FIG. 13, the first power element 3 is disposed directly above the circuit substrate 2. Therefore, the circuit substrate 2 exists directly below the first power element 3. The first power element 3 is in contact indirectly with the heat radiator 406 through the heat conductor 5. The heat radiator 406 is provided on an inner surface of the top wall of the cover 11 such that heat can be transferred from the heat radiator 406 to the cover 11. The cover 11 is made of a material having thermal conductivity and is mounted on the base 15a of the base case 15 such that heat can be transferred from the cover 11 to the base 15a. The heat transferred from the exterior part 30 of the first power element 3 to the heat radiator 406 through the heat conductor 5 transfers to the top wall of the cover 11, the lateral wall extending downward, the base 15a, and then the vehicle member 7 through the bracket 70, thereby the heat being released.

As shown in FIG. 14, the power line 32 of the first power element 3 is not connected to the circuit substrate 2, and is connected to the first input-output terminal 140 and the second input-output terminal 141 through a harness 133. The signal line 31 is connected to the circuit substrate 2. As shown by a dash line in FIG. 14, the end portion 20, which is a part of the outer peripheral edge of the circuit substrate, is located at a position overlapping with the first power element 3 that exists at a position higher than the circuit substrate 2. In other words, the first end portion 30a, which is a part of the outer peripheral edge of the first power element 3 facing the substrate, is provided at a position directly above the circuit substrate 2. The second end portion 30b opposite to the first end portion 30a is provided at a position above and outside the circuit substrate 2. Therefore, when the first power element 3 and the circuit substrate 2 are viewed from above, the first power element 3 includes the overlapping portion 30c that overlaps the circuit substrate 2, and the remaining portion 30d that does not overlap the circuit substrate 2. Further, it is preferable that the first power element 3 and the circuit substrate 2 have a positional relationship that the volume of the remaining portion 30d is equal to or larger than the volume of the overlapping portion 30c.

According to the sixth embodiment, the distance between the power line 32 and the circuit substrate 2 to which the signal line 31 is connected can be secured. Thus, the influence of noise on the circuit substrate 2 can be reduced, and the existence of the overlapping portion 30c contributes to miniaturization of the battery device 210. In addition, since the power line 32 protrudes outward of the circuit substrate 2, it is possible to provide a structure that facilitates coupling between the power line 32 and the harness 133. Since the heat of the first power element 3 is more easily transmitted to the upper side than the lower side, a capability of releasing the heat of the first power element 3 can be enhanced.

Seventh Embodiment

Figure 15:
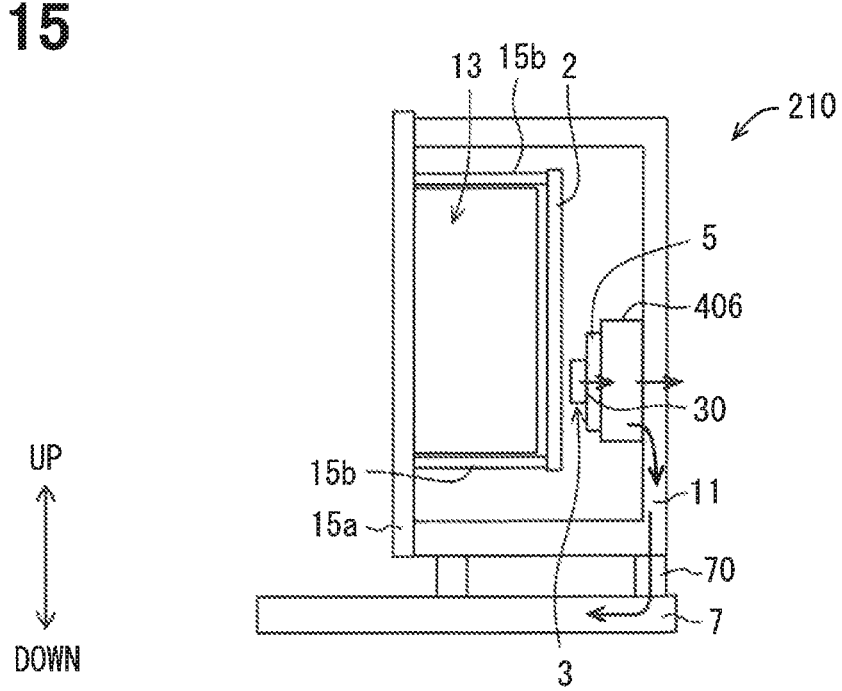
FIG. 15 is a side view showing a relationship between a circuit substrate, a power element, and a heat radiator according to at least one embodiment.

In the seventh embodiment, the battery device 210 of the sixth embodiment is placed vertically with respect to the vehicle member 7 and will be described with reference to FIG. 15. In FIG. 15, components denoted by the same reference numerals as those in the drawings of the above embodiments are the same components and exert similar operational effects. The heat release path from the first power element 3 to the vehicle member 7 in the battery device 210 placed as in the seventh embodiment is similar to that of the sixth embodiment. The battery device 210 of the seventh embodiment exhibits the same operational effects as the operational effects described in the sixth embodiment.

Eighth Embodiment

Figure 16:
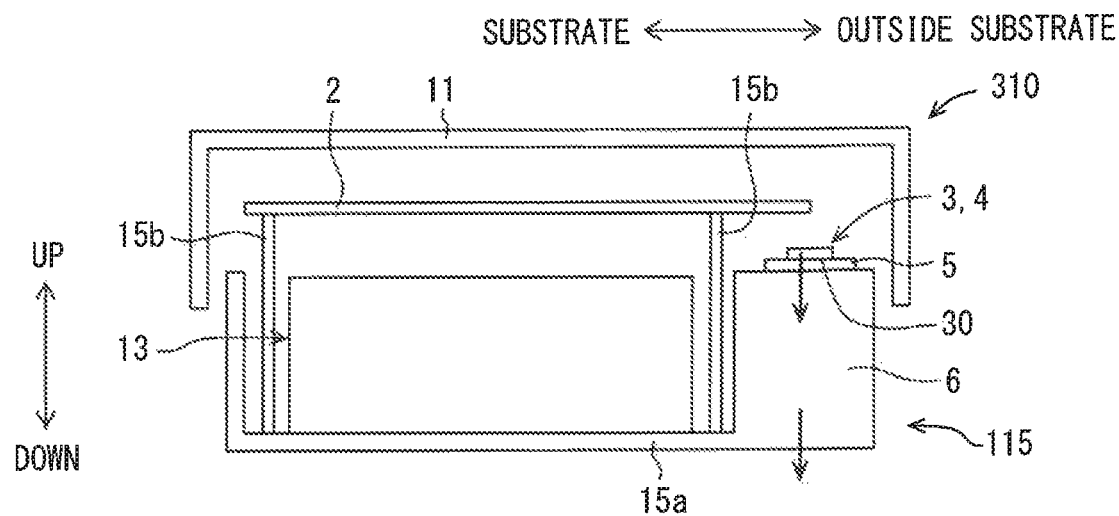
FIG. 16 is a schematic diagram showing a heat transfer path through which heat of a power element is transferred to the battery device of at least one embodiment.

In an eighth embodiment, a battery device 310 which is another embodiment of the first embodiment will be described with reference to FIG. 16. In FIG. 16, components denoted by the same reference numerals as those in the drawings of the first embodiment are the same components and exert similar operational effects. The heat release path from the first power element 3 or the second power element 4 to the vehicle member 7 in the battery device 310 is similar to that of the battery device 10 of the first embodiment. The battery device 310 exhibits the same operational effects as those of the battery device of the first embodiment or the fifth embodiment. Points different from the first embodiment and the fifth embodiment will be described below.

As shown in FIG. 16, the heat radiator 6 of the battery device 310 forms a part of a base case 115. The heat radiator 6 forms a standing wall standing from the base 15a which is the bottom of the base case 115. The heat radiator 6 is made of the same material as the base case 115, for example, aluminum, copper, or an alloy thereof. The first power element 3 and the second power element 4 are disposed such that their exterior parts are in contact directly or indirectly through the heat conductor 5 with the standing wall erecting from the base 15a. In addition, the first power element 3, the second power element 4, and the heat radiator are positioned below and away from the circuit substrate 2 as shown in FIG. 16, but may be, alternatively, positioned above and away from the circuit substrate 2.

According to the battery device 310 of the eighth embodiment, the heat radiator 6 is a part of the base case 115 and is the standing wall formed so as to erect from the base 15a. According to this configuration, since the heat radiator 6 is a part of the base case 115, resistance of heat transfer from the heat radiator 6 to the base case 115 can be reduced, and the capability of releasing heat of the switch can be improved. Since the heat radiator 6 is a part of the base case 115 and is the standing wall standing upright from the base 15a, the standing wall can prevent the switch from being wet or submerged. In addition, the standing wall for protecting the battery pack 13 from being wet or immersed can be utilized as the heat radiator 6, and thereby the battery device 310 can be downsized and the number of components can be reduced.

The exterior part of the switch is in contact directly or indirectly through the heat conductor 5 with the upper surface of the standing wall which is the heat radiator 6. According to this configuration, the switch can be placed at a high position by utilizing the standing wall. Thus, it is possible to provide the battery device 310 in which the switch is hardly brought into a state of being wet or submerged.

Ninth Embodiment

Figure 17:
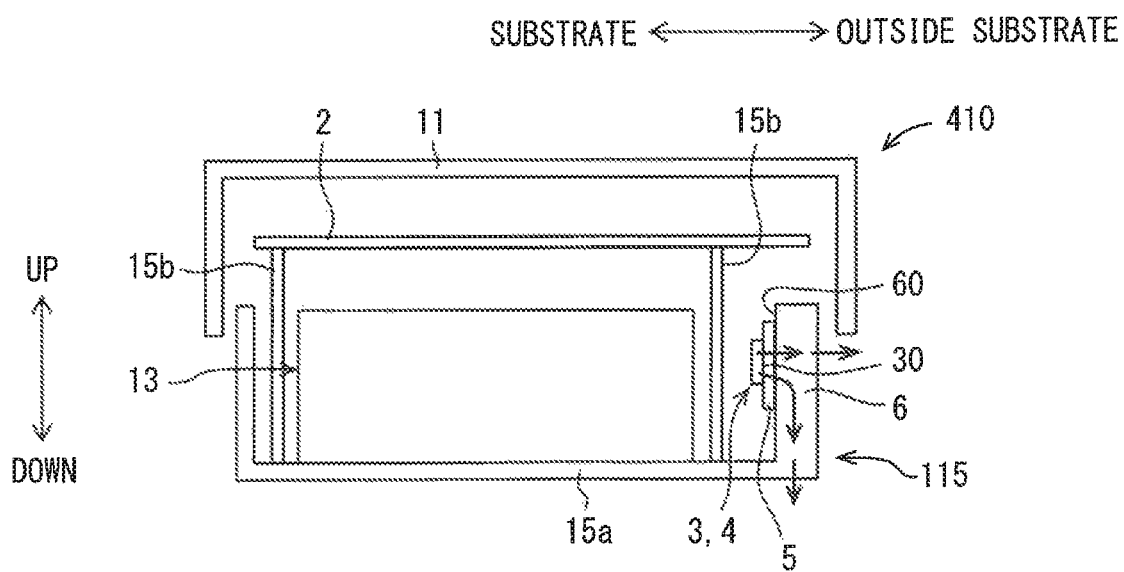
FIG. 17 is a schematic diagram showing a heat transfer path through which heat of a power element is transferred to the battery device of at least one embodiment.

In a ninth embodiment, a battery device 410 which is another embodiment of the first embodiment will be described with reference to FIG. 17. In FIG. 17, components denoted by the same reference numerals as those in the drawings of the first embodiment are the same components and exert similar operational effects. The heat release path from the first power element 3 or the second power element 4 to the vehicle member 7 in the battery device 410 is similar to that of the battery device 10 of the first embodiment. The battery device 410 exhibits the same operational effects as those of the battery device of the first embodiment or the eighth embodiment. Points different from the first embodiment and the eighth embodiment will be described below.

As shown in FIG. 10, the first power element 3 and the second power element 4 are disposed such that their thickness direction are along the main surface of the circuit substrate 2, and the first power element 3 and the second power element 4 are in contact indirectly through the heat conductor 5 with the heat radiator 6 forming the standing wall erecting from the base 15a. The first power element 3 and the second power element 4 are in contact with the heat radiator 6 such that heat can be transferred therebetween, and first power element 3 and the second power element 4 are vertically arranged such that an extending direction of the signal line from the exterior part is orthogonal to the main surface of the circuit substrate 2. The first power element 3 and the second power element 4 are disposed on a lateral surface 60 of the standing wall erecting from the base 15a. Thus, the standing wall as the heat radiator 6 has the lateral surface 60 spreading in the vertical direction in a thermal connection portion with the first power element 3 and facing inward the battery pack 13.

In addition, the exterior part 30 of the first power element 3 and the exterior part of the second power element 4 may be in direct contact with the standing wall. Further, the first power element 3, the second power element 4, and the heat radiator are positioned below and away from the circuit substrate 2 as shown in FIG. 17, but may be, alternatively, positioned above and away from the circuit substrate 2.

According to the above configuration, the heat transferred from the exterior part of each power element through the heat conductor 5 to the standing wall of the heat radiator 6 is transferred in the lateral direction to an outer lateral surface to be released to ambient air and also transferred to the base 15a and then to the vehicle member 7 through the bracket 70.

According to the ninth embodiment, the exterior part of the switch is in contact directly or indirectly through the heat conductor 5 with the lateral surface 60 of the standing wall which is the heat radiator 6. According to this configuration, heat generated from the switch can be released to the outside atmosphere through the standing wall, and also can be released to the vehicle member 7 through the base 15a. These two heat release paths enhance the heat radiation performance, and each heat release path can be short.

According to the battery device 410 of the ninth embodiment, the thickness direction of the switch set parallel to the width direction or the lateral direction of the battery device 410. Thus, the size of the battery device 410 in its width direction can be reduced.

The exterior part of the switch is in contact directly or indirectly through the heat conductor 5 with the lateral surface 60 that faces the battery pack 13 on the standing wall which is the heat radiator 6. According to this configuration, the switch can be protected from external force. Further, the standing wall serves as a barrier against water from the outside or water immersion, and thus the waterproof effect of the switch can be enhanced.

The exterior part of the switch may be in contact directly or indirectly through the heat conductor 5 with the lateral surface that is on an outer side of the standing wall which is the heat radiator 6.

The disclosure of this specification is not limited to the illustrated embodiment. The disclosure encompasses the illustrated embodiments and modifications by those skilled in the art based thereon. The present disclosure is not limited to combinations disclosed in the above-described embodiment but can be implemented in various modifications. The present disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment.

The power element in the above embodiments can be replaced with a mechanical relay that does not have a semiconductor element and controls input and output of electric power to and from the battery. The mechanical relay is, for example, a switch having a coil and a contact and controlling the input and output of electric power by closing the contact and allowing current to flow therethrough. In the case of a mechanical relay, its exterior part forms a rectangular parallelepiped case made of resin, for example. As described above, the signal line 31 and the power line 32 individually protrude outside the case. As described above, an example of the switch of the present disclosure includes the power element and the mechanical relay.

In the above embodiment, the unit cells constituting the external battery 17 and the assembled battery 13 are not limited to the lead storage battery and the lithium ion secondary battery described in the first embodiment, and may be, for example, a nickel hydrogen secondary battery or an organic radical battery.

In the above embodiments, the power element and the circuit substrate 2 partially overlap each other when viewed from above. However, the power element and the circuit substrate 2 may entirely overlap each other. In addition, the power element and the circuit substrate 2 may not overlap at all.

In the above-described embodiment, the unit cell included in the battery device may have a configuration in which an exterior case has a thin flat plate shape and the exterior case is formed of a laminate sheet, for example. The laminate sheet is made of a highly insulating material. In this case, the unit cell has an internal space of a flat container that is hermetically sealed by sealing the end portions of the laminate sheet, for example, by heat-sealing the end portions of the laminate sheet. The internal space houses therein a battery main body including an electrode assembly, an electrolyte, a terminal connector, a part of a positive electrode terminal, and a part of a negative electrode terminal. Therefore, in the unit cell, the peripheral edge of the flat container is sealed, and thus the battery main body is hermetically housed in the flat container. The unit cell has a pair of electrode terminals drawn outward from the flat container.

In the above-described embodiments, the unit cell included in the battery device may employ, for example, a unit cell having a columnar outer shape.

In the above-described embodiments, the battery provided in the battery device can be composed of one or more unit cells. The multiple unit cells may be stacked in the vertical direction or may be stacked side by side in the horizontal direction.

A comparative example will be described. In a battery unit of the comparative example, a power element for power control is mounted on a control substrate. Therefore, there is a restriction of heat resistant temperature of the control substrate which is lower in heat resistant temperature than the power element. Due to the restriction of the heat resistance temperature, heat generation of a switch is required to be reduced, and it may be difficult to deliver a necessary switching performance.

In contrast, according to the present disclosure, the battery device is capable of improving a performance of a switch which controls input and output of power to and from a battery.

According to an embodiment of the present disclosure, the battery device includes a battery, a circuit substrate, a switch and a heat radiator. The circuit substrate is electrically connected to the battery. The switch is configured to control input and output of electric power to and from the battery, and has an exterior part forming an outer surface of the switch and being away from the circuit substrate. The heat radiator is made of a material having thermal conductivity and is in contact directly or indirectly through a heat conductor with the exterior part of the switch so that heat of the switch transfers to the heat radiator.

According to the battery device of the present disclosure, the switch is in a state where the exterior part is away from the circuit substrate, and the exterior part is in contact directly or indirectly through the heat conductor with the heat radiator. Thus, the heat of the switch quickly transfers to the heat radiator rather than to the circuit substrate. Therefore, the battery device can be obtained, in which it is unnecessary to take measures for suppressing heat generation of the switch in order to reduce a thermal influence on the circuit substrate. In addition, it is possible to avoid situations where the heat resistant temperature of the circuit substrate becomes a bottleneck and the performance of the switch cannot be fully delivered. Therefore, it is possible to provide the battery device capable of delivering the performance of the switch without restriction of the heat resistant temperature of the circuit substrate.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A battery device comprising:
a battery;
a circuit substrate electrically connected to the battery;
a switch configured to control input and output of electric power to and from the battery, the switch being arranged in the battery device such that an empty space gap is present between the switch and the circuit substrate, and the switch is not in direct physical contact with the circuit substrate;
a heat radiator made of a material having thermal conductivity and being in contact directly or indirectly through a heat conductor with an exterior part of the switch so that heat of the switch transfers to the heat radiator; and
a heat transfer path that transfers heat from the exterior part of the switch through the heat radiator to a base of a base case housing the battery, wherein
the circuit substrate is fixed to a member which is separated from the heat radiator and branches and extends from the base.

2. The battery device according to claim 1, wherein
the heat radiator is connected to a vehicle member, which is a part of a vehicle, through the base such that heat is allowed to be transferred from the heat radiator to the vehicle member.

3. The battery device according to claim 1, wherein
the heat radiator is integrated with the base case.

4. The battery device according to claim 3, wherein
the heat radiator is a standing wall which is a part of the base case and erects from the base.

5. The battery device according to claim 4, wherein
the exterior part of the switch is in contact directly or indirectly through the heat conductor with an upper surface of the standing wall.

6. The battery device according to claim 4, wherein
the exterior part of the switch is in contact directly or indirectly through the heat conductor with a lateral surface of the standing wall.

7. The battery device according to claim 4, wherein
the exterior part of the switch is in contact directly or indirectly through the heat conductor with a lateral surface of the standing wall facing the battery.

8. The battery device according to claim 1, wherein
the switch and the heat radiator are positioned below and away from the circuit substrate.

9. The battery device according to claim 1, wherein
the switch and the heat radiator are positioned above and away from the circuit substrate.

10. The battery device according to claim 1, wherein
the switch includes an overlapping portion that overlaps the circuit substrate, and a remaining portion that does not overlap the circuit substrate, in a top view of the switch and the circuit substrate.

11. The battery device according to claim 10, wherein
the volume of the remaining portion is larger than or equal to the volume of the overlapping portion.

12. The battery device according to claim 6, wherein
the switch has an outer shape in which a width of the exterior part is longer than a thickness of the exterior part, and
the switch is arranged such that a thickness direction of the switch is along or oblique to a main surface of the circuit substrate.

13. The battery device according to claim 1, wherein
the battery is arranged in such a manner that an electrode terminal of the battery is exposed in a lateral direction, and
the switch is disposed adjacent to the electrode terminal with respect to the battery.

14. The battery device according to claim 1, wherein
the battery includes a plurality of battery stacks in which a plurality of unit cells are stacked, and
the switch is disposed adjacent to one battery stack having a smaller number of stacked unit cells among the plurality of battery stacks.

15. The battery device according to claim 1, wherein
the switch includes a first switch that controls input and output of electric power to and from an external battery provided outside the battery device, and a second switch that controls input and output of electric power to and from the battery included in the battery device.

16. The battery device according to claim 1, wherein the circuit substrate is directly joined to the member which is separated from the heat radiator and branches and extends from the base.

17. A battery device comprising:
a battery;
a circuit substrate electrically connected to the battery;
a switch configured to control input and output of electric power to and from the battery, the switch being arranged in the battery device such that an empty space gap is present between the switch and the circuit substrate, and the switch is not in direct physical contact with the circuit substrate; and
a heat radiator made of a material having thermal conductivity and being in contact directly or indirectly through a heat conductor with an exterior part of the switch so that heat of the switch transfers to the heat radiator, wherein
the switch includes a signal line transmitting an electric signal, and a power line transmitting electric power, and
the power line is connected to an input-output terminal of the battery without the power line being connected to the circuit substrate,
the power line is connected to the input-output terminal through a bus bar or a harness, and
the signal line is connected to the circuit substrate.

18. A battery device comprising:
a battery;
a circuit substrate electrically connected to the battery;
a switch configured to control input and output of electric power to and from the battery, and having an exterior part forming an outer surface of the switch and being away from the circuit substrate, such that an empty space gap is present between the switch and the circuit substrate, and the switch is not in direct physical contact with the circuit substrate; and
a heat radiator made of a material having thermal conductivity and being in contact directly or indirectly through a heat conductor with the exterior part of the switch so that heat of the switch transfers to the heat radiator, wherein
the switch and the heat radiator are positioned below and away from the circuit substrate.

* * * * *